(12) United States Patent
Akira

(10) Patent No.: US 9,287,813 B2
(45) Date of Patent: Mar. 15, 2016

(54) PULSED-MOTOR DRIVING APPARATUS AND PULSED-MOTOR DRIVING METHOD

(71) Applicant: NK WORKS CO., LTD., Wakayama (JP)

(72) Inventor: Toshiro Akira, Wakayama (JP)

(73) Assignee: NK WORKS CO., LTD., Wakayama (JP)

( * ) Notice: Subject to any disclaimer, the term of this patent is extended or adjusted under 35 U.S.C. 154(b) by 56 days.

(21) Appl. No.: 14/186,705

(22) Filed: Feb. 21, 2014

(65) Prior Publication Data

US 2014/0239873 A1   Aug. 28, 2014

(30) Foreign Application Priority Data

Feb. 22, 2013   (JP) .................................. 2013-033709

(51) Int. Cl.
    *H02P 8/00* (2006.01)
    *H02P 8/14* (2006.01)
    *H02P 8/32* (2006.01)
    *H02P 8/12* (2006.01)

(52) U.S. Cl.
    CPC ..... *H02P 8/14* (2013.01); *H02P 8/12* (2013.01); *H02P 8/32* (2013.01)

(58) Field of Classification Search
    CPC ............... H02P 8/14; H02P 8/32; H02P 8/12; H02P 8/22; G05B 19/40
    USPC ........................................................ 318/696
    See application file for complete search history.

(56) References Cited

U.S. PATENT DOCUMENTS

| 4,282,594 | A | * | 8/1981 | Ichikawa | ............... G04G 3/022 345/34 |
| 4,699,518 | A | * | 10/1987 | Tanabe | ................. G04G 13/021 368/273 |
| 4,725,967 | A | * | 2/1988 | Aiba | .................. G06K 15/1219 347/135 |
| 2011/0115422 | A1 | * | 5/2011 | Takeuchi | .................. H02P 6/16 318/400.13 |

FOREIGN PATENT DOCUMENTS

| JP | 2007-060757 A | 3/2007 |
| JP | 2007060757 A | * 3/2007 |

* cited by examiner

*Primary Examiner* — Kawing Chan
*Assistant Examiner* — Bradley Brown
(74) *Attorney, Agent, or Firm* — Norton Rose Fulbright US LLP

(57) ABSTRACT

Frequency-divided clock generating section generates a frequency-divided clock having a predetermined driving frequency by dividing a base clock having a base frequency based on a set frequency-division ratio. Division-ratio calculating section calculates a real number ratio of the driving frequency relative to the base frequency and sets a rounded frequency-division ratio by rounding the real number ratio as the frequency-division ratio while calculating a rounding error. Accumulated error calculating section adds the rounding error to an accumulated error when frequency-divided clock generating section generates a frequency-divided pulse which is a one cycle of frequency-divided clock. Division-ratio correcting section uses, as the frequency-division ratio, the rounded frequency-division ratio if the accumulated error does not exceed a threshold value, and a value obtained by correcting the rounded frequency-division ratio based on the threshold value and subtracts the threshold value from the accumulated error if the accumulated error exceeds a threshold value.

5 Claims, 3 Drawing Sheets

Fig. 4

| frequency-divided pulse No. | accumulated error | frequency-division ratio |
|---|---|---|
| 1 | 0.52 | 3007 |
| 2 | (1.04−1=)0.04 | 3007 |
| 3 | 0.56 | 3008 |
| 4 | (1.08−1=)0.08 | 3007 |
| 5 | 0.60 | 3008 |
| 6 | (1.12−1=)0.12 | 3007 |
| 7 | 0.64 | 3008 |
| 8 | (1.16−1=)0.16 | 3007 |
| 9 | 0.68 | 3008 |
| 10 | (1.2−1=)0.2 | 3007 |
| ⋮ | ⋮ | 3008 |
| 24 | (1.48−1=)0.48 | ⋮ |
| 25 | (1.00−1=)0.00 | 3008 |
| 26 | 0.52 | 3008 |
| ⋮ | ⋮ | 3007 |

PULSED-MOTOR DRIVING APPARATUS AND PULSED-MOTOR DRIVING METHOD

This application claims priority from Japanese Patent Application No. JP2013-033709 filed Feb. 22, 2013, which is hereby incorporated by reference in its entirety.

TECHNICAL FIELD

The present invention relates to a technique of driving a pulsed motor with a frequency-divided clock obtained by dividing a base clock having a predetermined frequency.

BACKGROUND ART

There is known a motor called a pulsed motor (a stepper motor) which is rotated according to a clock (pulses) inputted thereto. As such pulsed motor allows precision control of its rotation, it is being used in various fields including a conveyer mechanism in e.g. a printer.

A clock to be inputted to a pulsed motor can be generated by e.g. dividing a base clock having a predetermined frequency. However, with such generation method, it is only possible to generate a clock having a 1/n (n is an integer) of the base clock frequency.

In order to solve such problem as above, according to a technique disclosed in Patent Document 1, there is generated a frequency-divided clock comprising, in a mixed state, frequency-divided pulse signals obtained by division based on multiple different frequency division ratios. For instance, with a frequency-divided clock including frequency-divided pulse signals of a frequency-division ratio of 5 and frequency-divided pulse signals of a division ratio of 6 in the mixing ratio of 1:1, it is possible to generate a frequency-divided clock of a frequency-division ratio of 5.5 as a whole.

PRIOR-ART DOCUMENTS

Patent Documents

[Patent Document 1] Japanese Unexamined Patent Application Publication No. 2007-060757

SUMMARY OF THE INVENTION

Object to be Achieved by Invention

However, the technique of Patent Document 1 above requires determination of a plurality of division ratios and a mixing ration thereof. Namely, for generation of frequency-divided clock, the technique requires setting of many parameters. For this reason, generation of a frequency-divided clock having a desired frequency may lead to complication of calculation for parameters determination.

In view of the above, the object of the present invention is to provide a pulsed-motor driving technique that enables a pulsed-motor to be driven with a frequency-divided clock having a desired frequency.

Solution to Achieve Object

According to one preferred embodiment of a pulsed-motor driving apparatus relating to the present invention, including a frequency-divided clock generating section for generating a frequency-divided clock having a predetermined driving frequency by dividing a base clock having a base frequency based on a set frequency-division ratio, the apparatus comprises:

a division-ratio calculating section calculating a real number ratio of the driving frequency relative to the base frequency and setting a rounded frequency-division ratio obtained by rounding the real number ratio as the frequency-division ratio and calculating a rounding error in the rounding of the real number ratio;

an accumulated error calculating section adding the rounding error to an accumulated error when the frequency-divided clock generating section generates a frequency-divided pulse which is a one cycle of frequency-divided clock; and a division-ratio correcting section that uses the rounded frequency-division ratio as the frequency-division ratio if the accumulated error does not exceed a threshold value and that uses, as the frequency-division ratio, a value obtained by correcting the rounded frequency-division ratio based on the threshold value and subtracting the threshold value from the accumulated error if the accumulated error exceeds a threshold value.

With the above-described arrangement, firstly, as a frequency-division ratio, there is set a value obtained by rounding a real number ratio of a driving frequency relative to a base frequency to an integer value (a rounded frequency-division ratio). In this, the arrangement also calculates a rounding error that occurred in the course of rounding of the real number to the integer. Thereafter, like an ordinary pulsed-motor generating device, there is generated a frequency-divided pulse (one cycle of the frequency-divided clock), based on a count-number value of pulses of the base clock (one cycle of the base clock) and the calculated frequency-division ratio. In this, if the real number ratio is not an integer, this means that the rounded frequency-division ratio contains an error. Therefore, the frequency of the frequency-divided clock comprised of the frequency-divided pulse generated as above does not agree with the driving frequency.

In order to cause the frequency of the generated frequency-divided clock to further approximate the driving frequency, according to the present invention, a rounding error that occurred in the course of rounding of a real number ratio to a frequency-division ratio is calculated in advance. Then, when one frequency-divided pulse is generated, the arrangement calculates in advance an accumulated rounding error comprised of accumulation of errors that occurred in the course of rounding. If the accumulated error exceeds a predetermined threshold (e.g. 1 (one)), a value obtained by correcting the rounded frequency-division ratio based on this threshold value will be employed as the frequency-division ratio. On the other hand, if the accumulated error does not exceed the threshold value, the rounded frequency-division ratio will be employed as the frequency-division ratio.

If the frequency-divided clock is generated in the manner described above, although the frequency-division ratio of each individual frequency-divided pulse does not agree to the real number ratio, the frequency of the plurality of pulses (from a pulse of a non-corrected frequency-division ratio to a pulse of a corrected frequency-division ratio) can be made approximate to the driving frequency. That is, the frequency-divided clock generated by the pulsed-motor driving apparatus according to the present invention contains an error microscopically, but this error can be made minor macroscopically. Further, with the inventive pulsed-motor driving apparatus, a frequency-divided clock having a frequency with only a small error relative to the driving frequency can be generated with the simple processing of calculation of accumulated errors and switchover of a frequency-division ratio to be used.

Rounding of a real number ratio to an integer can be either rounding-down or rounding-up. In case a frequency-division ratio was calculated by rounding-down of the real number ratio, i.e. discarding the fractional part, the division-ratio correcting section adds the threshold value to the frequency-division ratio. On the other hand, in case a frequency-division ratio was calculated by rounding-up of the real number ratio, the division-ratio correcting section subtracts the threshold value from the frequency-division ratio.

Incidentally, the greater the digits of the rounding error, the more approximation of the frequency of the generated frequency-divided clock to the driving frequency. For this reason, according to one preferred embodiment of the inventive pulsed-motor driving apparatus, the apparatus allows change of the digits of the rounding error. For instance, this number of digits can be changed according to a required clock precision.

According to one preferred embodiment of a pulsed-motor driving method relating to the present invention, for generating a frequency-divided clock having a predetermined driving frequency by dividing a base clock having a base frequency based on a set frequency-division ratio, the method comprises:

a division-ratio calculating step for calculating a real number ratio of the driving frequency relative to the base frequency and setting a rounded frequency-division ratio obtained by rounding the real number ratio as the frequency-division ratio and calculating a rounding error in the rounding of the real number ratio;

an accumulated error calculating step for adding the rounding error to an accumulated error when a frequency-divided pulse which is a one cycle of frequency-divided clock is generated; and a division-ratio correcting step that uses the rounded frequency-division ratio as the frequency-division ratio if the accumulated error does not exceed a threshold value and that uses, as the frequency-division ratio, a value obtained by correcting the rounded frequency-division ratio based on the threshold value and subtracting the threshold value from the accumulated error if the accumulated error exceeds a threshold value.

This pulsed-motor driving method too achieves the same advantageous function/effect as the pulsed-motor driving apparatus described above. And, to this pulsed-motor driving method too, the above-described additional features for the pulsed-motor driving apparatus can be applied.

BRIEF DESCRIPTION OF THE DRAWINGS

FIG. 4 is a table showing transitions of a generated frequency-divided clock, an accumulated error and a frequency-division ratio.

MODES OF EMBODYING INVENTION

Figure 1:
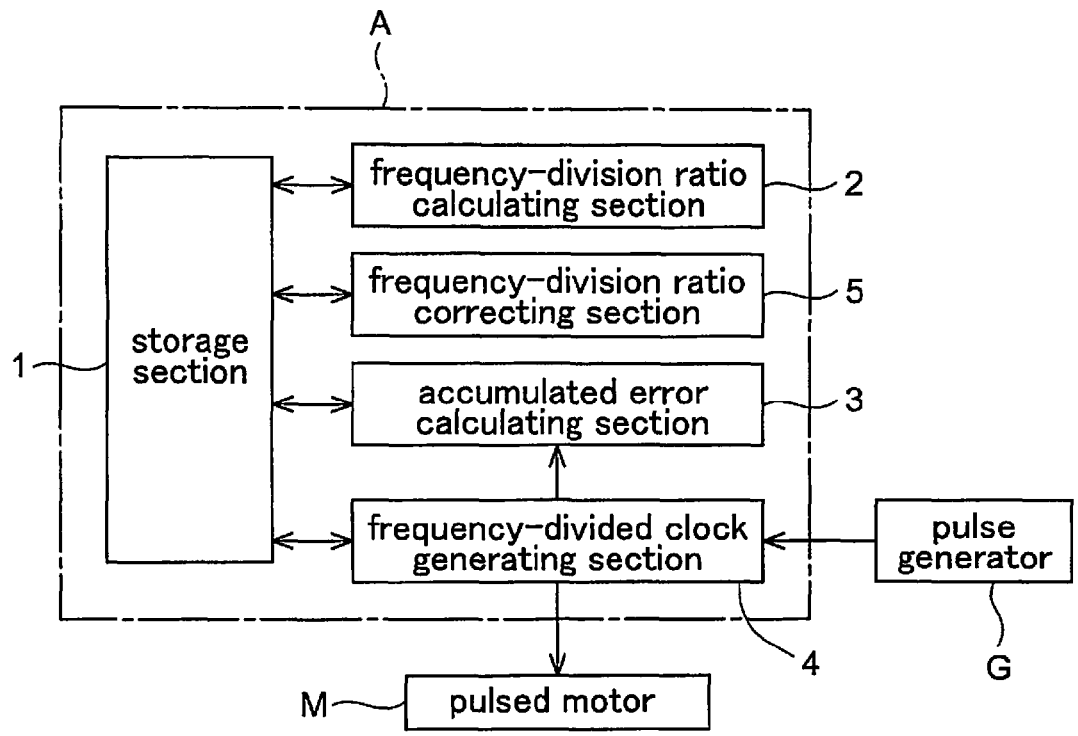
FIG. 1 is a functional block diagram of a pulsed-motor driving apparatus.

Next, embodiments of a pulsed-motor driving apparatus of the invention will be explained with reference to the accompanying drawings. FIG. 1 is a functional block diagram of a pulsed-motor driving apparatus relating to this embodiment. As shown, to the pulsed-motor driving apparatus A, there are connected a pulsed motor M to be driven and a pulse generator G generating a base clock having a base frequency. The pulse motor M and the pulse generator G are standard type, so explanation thereof will be omitted herein.

Incidentally, the term: "a pulse" means one cycle of clock. For instance, a pulse is constituted of a signal from rising of the clock to a timing immediately before the next rising thereof. Further, a base pulse means a pulse of a base clock and a frequency-divided pulse means a pulse of a frequency-divided clock, respectively.

As shown in the figure, the pulsed-motor driving apparatus A according to this embodiment includes a storage section 1, a frequency-division ratio calculating section 2, an accumulated error calculating section 3, a frequency-divided clock generating section 4 and a frequency-division ratio correcting section 5.

The storage section 1 is a functional section for storing various information for use in various functional sections. In the instant embodiment, various information such as variables, flags, etc. are to be stored in the storage section 1, and in the following discussion, inputs/outputs of various information such as variables, flags, etc. will not be explicitly described. Incidentally, the storage section 1 can comprise a volatile storage medium such as a RAM, a non-volatile storage medium such as a flash memory, etc.

The frequency-division ratio calculating section 2 calculates a frequency-division ratio from a base frequency of a base clock generated by the pulse generator G and a driving frequency of a clock for driving the pulsed motor M. More particularly, the base frequency is divided by the driving frequency. In general, a solution (a quotient) of this division is a real number (to be referred to as "a real number ratio" hereinafter). The frequency-division ratio calculating section 2 sets a value obtained by rounding this real number ratio to an integer (to be referred to as "a rounded frequency-division ratio" hereinafter) as a frequency-division ratio. Also, the frequency-division ratio calculating section 2 calculates a rounding error that occurred in the rounding of the real number ratio to the integer. Incidentally, the rounding error can be represented in the form of the number of digits of the limit of calculation precision. In this embodiment, however, the rounding error is presented in the form of a preset number of digits.

The method of rounding a real number ratio to an integer can employ either rounding-down or rounding-up. Further, which method to be used can be switched over according to an input from the outside. Or, which method to be used can be switched over, based on the magnitude of the fractional part of the real number ratio. For instance, the rounding-down method can be employed if the fractional part of the real number ratio is below 0.5 and the rounding-up method can be employed in the fractional part is 0.5 or greater. Whichever method may be employed, the rounding error will be represented as a positive number.

Further, depending on the method employed for rounding, a rounding flag will be set. The value of this rounding flag can be a represented by using a boolean value, an integer value, etc. In the instant embodiment, the value will be set to "1 (one)" in the case of rounding-down and to "−1 (minus one)" in the case of rounding-up.

The accumulated error calculating section 3 adds the rounding error to an accumulated error if it receives from the frequency-divided clock generating section 4 a report to the effect of completion of frequency-divided pulse generation.

Figure 2:
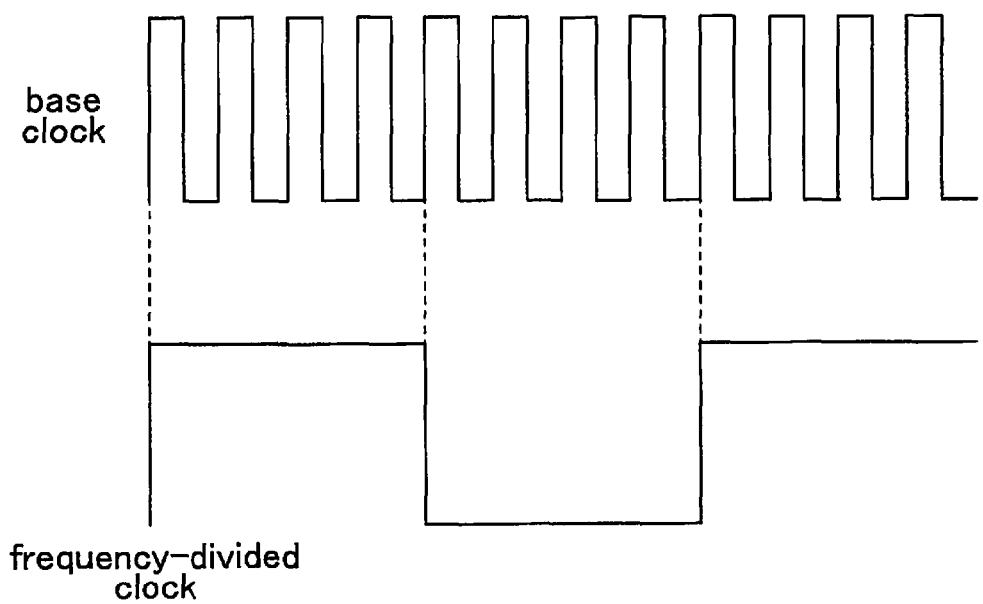
FIG. 2 is a diagram illustrating relationship between a base clock and a frequency-divided clock.

The frequency-divided clock generating section 4 generates a frequency-divided clock from the base clock in accordance with a set frequency-division ratio. FIG. 2 is a diagram showing relationship between the base clock and the frequency-divided clock when the frequency-division ratio is set to 4 (four). As shown in this diagram, the frequency-divided clock generating section 4 generates a frequency-divided clock having a rising segment having a width of: the frequency-division ratio×(multiplied by) the base pulse width and a falling segment having the same width. As this frequency-divided pulse is generated in series, a frequency-divided clock is generated. The generated frequency-divided clock is inputted to the pulse motor M. Further, upon completion of generation of the frequency-divided pulse, the frequency-divided clock generating section 4 reports this to the accumulated error calculating section 3. Incidentally, a pulse generated with a frequency-division ratio of N will be specifically referred to as an "N-frequency-divided pulse".

Further, the frequency-divided clock generating section 4 subtracts a threshold value from the accumulated error in case the frequency-divided pulse was generated with using a corrected rounded frequency-division ratio.

If an accumulated error exceeds a predetermined threshold, the frequency-divided ration correcting section 5 sets a value obtained by correcting the rounded frequency-divided ratio with using this threshold value. In this respect, it is to be noted, however, that this corrected frequency-division ratio is used for generation of one frequency-divided pulse only. Namely, once one frequency-divided pulse has been generated with using a corrected frequency-division ratio, the rounded frequency-divided pulse will be set as the frequency-divided pulse, again.

The method of correction of frequency-division ratio differs, depending on the method of rounding implemented at the time of calculation of the frequency-division ratio. Specifically in the case of rounding-down, the threshold value will be added to the frequency-division ratio. In the case of rounding-up, on the other hand, the threshold value will be subtracted from the frequency-division ratio.

Figure 3:
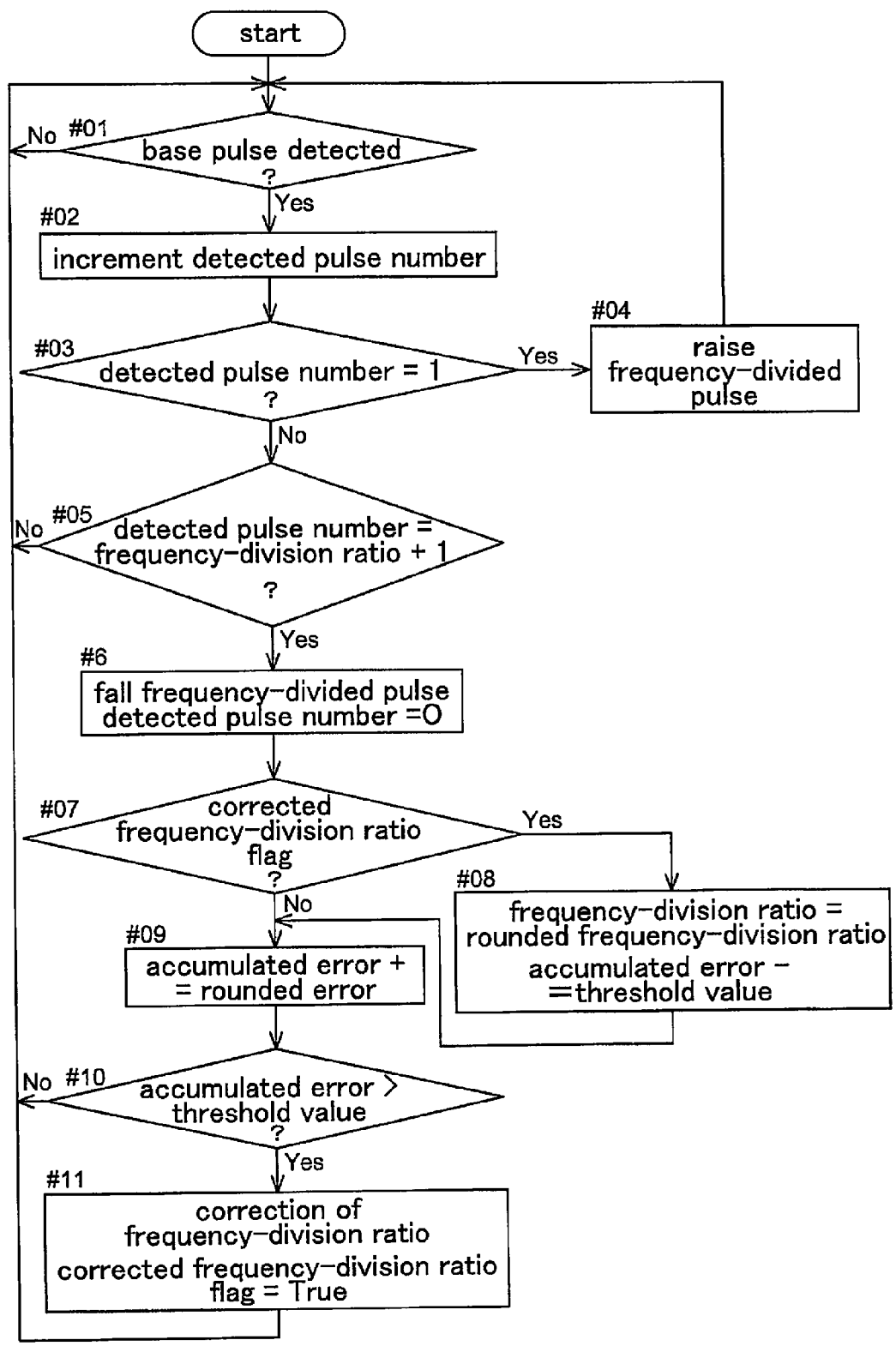
FIG. 3 is a flowchart illustrating a flow of a processing by the pulsed-motor driving apparatus.

Next, with reference to the flowchart of FIG. 3, there will be explained the flow of processing effected by the pulsed-motor driving apparatus according to the instant embodiment. Incidentally, in the instant embodiment, the number of digits of the rounding error is set as 2 (two) digits.

Firstly, prior to generation of a frequency-divided pulse, the frequency-division ratio calculating section 2 calculates a rounded frequency-division ratio and a rounded error, from the base frequency and the driving frequency read from the storage section 1 and sets the rounded frequency-division ratio as the frequency-division ratio. For instance, provided the base frequency is 6 MHz and the driving frequency is 1995 Hz, there is obtained: a real number ratio=6000000/1995=3007.581 . . . . Accordingly, there will be obtained a rounded frequency-division ratio of 3007 and a rounding error of 0.52. Further, a detected pulse number and an accumulated error are reset to 0 (zero), respectively. Also, a rounding flag will be set. As described hereinbefore, the rounding flag will be set to 1 in the case of rounding-down and to −1 in the case of rounding-up.

Upon detection of the base pulse (YES branching at #01), the frequency-divided clock generating section 4 adds 1 (one) to the detected pulse number (#02). Further, when the detected pulse number becomes 1 (one) (YES branching at #03), the frequency-divided clock generating section 4 raises the frequency-divided pulse (#04) and moves its processing to #01. When the detected pulse number becomes +1 (YES branching at #05), the frequency-divided clock generating section 4 drops the frequency-divided pulse (#06). In this, the the frequency-divided clock generating section 4 resets the detected pulse number to 0 (zero) and reports completion of frequency-divided pulse to the accumulated error calculating section 3, and also, if a corrected frequency-division ratio flag to be described later is set to "TRUE" (YES branching at #07), the rounded frequency-division ratio is set as the frequency-division ratio and the threshold value is subtracted from the accumulated error (#08).

Upon receipt of the report of completion of frequency-divided pulse generation from the frequency-divided clock generating section 4, the accumulated error calculating section 3 adds the rounded error to the accumulated error (#09).

Upon detection of the accumulated error exceeding the predetermined threshold (YES branching at #10), the frequency-division ratio correcting section 5 corrects the frequency-division ratio (#11). More particularly, in the case of rounding-down, the frequency-division ratio will be set as: the rounded frequency-division ratio+(plus) the threshold value. In the case of rounding-up, the frequency-division ratio will be set as: the rounded frequency-division ratio−(minus) the threshold value. In the instant embodiment, since the rounding flag is set as described above, whichever rounding method is used, the frequency-division ratio can be corrected by: frequency-division ratio=rounded frequency-division ratio+threshold value×(multiplied) rounding flag, without effecting any conditional branch. Further, the frequency-division ratio correcting section 5 will set a flag (to be referred to as "a corrected frequency-division ratio flag" hereinafter) indicative of a corrected frequency-division ratio being used to "TRUE". Incidentally, as the threshold value, any desired positive integer may be employed. However, the smaller the value, the better as it can minimize the error. So, 1 (one) is preferred.

With repetition of the above-described process, there will be generated a frequency-divided clock consisting of a clock having a rounded frequency-division ratio and a clock having a corrected rounded frequency-division ratio.

FIG. 4 is a table showing transitions of generated frequency-divided pulses, an accumulated error and a frequency-division ratio. As may be apparent from this table, when 2 (two) 3007 frequency-divided pulses were generated, the accumulated error has exceeded the threshold value: 1 (one). At this time, the corrected rounded frequency-division ratio will be set as the frequency-division ratio. Therefore, the third frequency-divided pulse has a frequency-division ratio of 3008. Subsequently thereto, up to the 25th frequency-divided pulse, the frequency-division ratio of the odd-numbered frequency-divided pulses is 3008 whereas the frequency-division ratio of the even-numbered frequency-divided pulses is 3007. Also, the 26th frequency-divided pulse has a frequency-division ratio of 3008. Here, if the group of pulses from the 2nd frequency-divided pulse to the 26th frequency-divided pulse are considered as one unit, of 25 frequency-divided pulses, 13 of them are 3008 frequency-divided pulses and 12 of them are 3007 frequency-divided pulses. Accordingly, the average frequency-division ratio of these 25 frequency-divided pulses is: (13×3008+12×3007)/25=3007.52. That is, this becomes very close to the real number ratio 3007.518 . . . which is represented by the base frequency/driving frequency. In view of the fact that the number of digits of the rounding error is set to two digits in the instant embodiment, it may be said that the average frequency-division ratio of the frequency-divided clock generated by the inventive pulse-motor driving apparatus is in agreement with the real number ratio. In other words, the frequency of the frequency-divided clock generated by the inventive pulse-motor driving apparatus is in substantial agreement with the required driving frequency.

On the other hand, the average frequency-division ratio of the frequency-divided clock containing 3007 frequency-divided pulses and 3008 frequency-divided pulses in the mixing ratio of 1:1, based on the above-described technique of Patent Document 1 is 3007.5, having a greater error than the average frequency-division ratio of the frequency-divided clock generated by the inventive pulse-motor driving apparatus.

Incidentally, although the number of digits of the rounding error is set to two digits in the instant embodiment, this number of digits can be changed, in accordance with a required driving precision of the pulsed motor. And, when higher driving precision is required, the number of digits of the rounding error should be increased in accordance therewith.

A frequency-divided clock having smaller error can be generated also by exponenting the base frequency by the power of 10 (ten), instead of changing the number of digits of the rounding error. In this case, the rounding error and the threshold value will respectively be 10th power of the rounding error and the threshold value provided in the foregoing embodiment. For instance, if the base frequency is multiplied by 100, the real number ratio will be: 600000000/1995=300751.879 . . . . In this case, the rounded frequency-division ratio will be set as 1/100 of the integer part of the real number ratio, whereas the rounding error will be 51.88, i.e. the portion of the ratio from its 10th place to the second place in the fractional part, and the threshold will be set to 100. If a frequency-divided clock is generated with using such values as above, it is possible to obtain precision substantially equal to that obtained when using a four-fractional-digits rounding error. This alternative method will be useful when a calculation unit having only a limited number of digits for fractional places is employed.

OTHER EMBODIMENT

In the foregoing embodiment, the correction is effected on the rounded frequency-division ratio on each occasion of an accumulated error exceeding a threshold value. Instead, a preliminarily corrected rounded frequency-division ratio may be calculated in advance and then use of the rounded frequency-division ratio and the use of the corrected rounded frequency-division ratio may be switched over, depending on whether the accumulated error exceeds the threshold value or not.

The invention claimed is:

1. A pulsed-motor driving apparatus including a frequency-divided clock generating section for generating a frequency-divided clock having a predetermined driving frequency by dividing a base clock having a base frequency based on a set frequency-division ratio, the apparatus comprising:
   a division-ratio calculating section calculating a real number ratio of the driving frequency relative to the base frequency and setting a rounded frequency-division ratio obtained by rounding the real number ratio as the frequency-division ratio and calculating a rounding error in the rounding of the real number ratio;
   an accumulated error calculating section adding the rounding error to an accumulated error when the frequency-divided clock generating section generates a frequency-divided pulse which is a one cycle of frequency-divided clock; and
   a division-ratio correcting section that uses the rounded frequency-division ratio as the frequency-division ratio if the accumulated error does not exceed a threshold value and that uses, as the frequency-division ratio, a value obtained by correcting the rounded frequency-division ratio based on the threshold value and subtracting the threshold value from the accumulated error if the accumulated error exceeds a threshold value.

2. A pulsed-motor driving apparatus according to claim 1, wherein the rounded error is a rounded-down error; and
   wherein the division-ratio correcting section sets, as the frequency-division ratio for temporary use, a value obtained by adding the threshold value to the frequency-division ratio.

3. A pulsed-motor driving apparatus according to claim 1, wherein the rounded error is a rounded-up error; and
   wherein the division-ratio correcting section sets, as the frequency-division ratio for temporary use, a value obtained by subtracting the threshold value from the frequency-division ratio.

4. A pulsed-motor driving apparatus according to claim 1, wherein the division-ratio calculating section is capable of changing the number of digits of the rounded error.

5. A pulsed-motor driving method for generating a frequency-divided clock having a predetermined driving frequency by dividing a base clock having a base frequency based on a set frequency-division ratio, the method comprising:
   a division-ratio calculating step for calculating a real number ratio of the driving frequency relative to the base frequency and setting a rounded frequency-division ratio obtained by rounding the real number ratio as the frequency-division ratio and calculating a rounding error in the rounding of the real number ratio;
   an accumulated error calculating step for adding the rounding error to an accumulated error when a frequency-divided pulse which is a one cycle of frequency-divided clock is generated; and
   a division-ratio correcting step that uses the rounded frequency-division ratio as the frequency-division ratio if the accumulated error does not exceed a threshold value and that uses, as the frequency-division ratio, a value obtained by correcting the rounded frequency-division ratio based on the threshold value and subtracting the threshold value from the accumulated error if the accumulated error exceeds a threshold value.

* * * * *